Oct. 3, 1961 D. L. HILEMAN 3,003,121

TRANSISTOR OSCILLATOR CONTROL CIRCUITS

Filed Nov. 6, 1959

DALE L. HILEMAN
INVENTOR.

BY Allen E. Botney, Agent

Morris Spector,
ATTORNEY

United States Patent Office 3,003,121

Patented Oct. 3, 1961

3,003,121
TRANSISTOR OSCILLATOR CONTROL CIRCUITS

Dale L. Hileman, United States Marine Corps, assignor to Thompson Ramo Wooldridge Inc., Los Angeles, Calif., a corporation of California Filed Nov. 6, 1959, Ser. No. 851,370
5 Claims. (Cl. 331—111)

The present invention relates in general to transistor oscillator control circuits and more particularly to circuits that utilize the discovery of a new and useful operating region of transistors.

An interesting discovery has been made relative to the operating characteristics of transistors, namely, that a regenerative action ensues when they are caused to conduct so heavily that the collector voltage drops below the base voltage. More specifically, when the referred-to effect happens, the base-collector junction becomes forward biased whereas under normal circumstances it is reverse biased. Forward biasing of this junction causes a further increase of base current which is contributed by the collector. The additional base current, in turn, causes a proportionally large increase in the collector current, which again results in an increase of base current, and so on, until the transistor "bottoms." Thus, it may be said that a kind of positive feedback effect or regenerative action occurs.

This newly discovered region of transistor operation presents a number of interesting possibilities for new transistor circuits that are inherently simple and inexpensive. A number of such circuits are shown and described herein by way of example and include free-running and single-shot multivibrators, a sine-wave oscillator and a frequency divider. However, the present invention encompasses not only these circuits but other circuits as well that utilize this region of operation.

It is, therefore, a principal object of the present invention to provide transistor circuits in which the transistors are subjected to a regenerative feedback type of action.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Figures 1, 2:
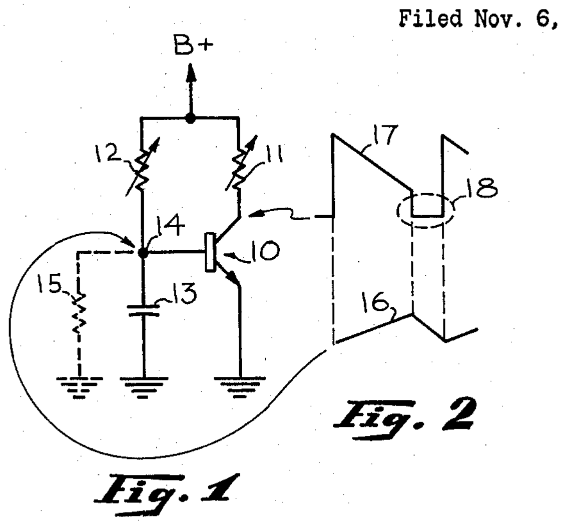
FIG. 1 is a schematic circuit of a free-running multivibrator according to the present invention.
FIG. 2 illustrates voltage waveforms appearing at points in the circuit of FIG. 1.

Referring now to the drawings, wherein like reference characters designate like or corresponding parts throughout the several views, particular reference is made to FIG. 1 wherein is shown a free-running multivibrator circuit according to the invention. As shown, the circuit includes a transistor 10 whose emitter element is connected to ground potential and whose collector element is connected through a resistor 11, which may be a variable resistor, to a positive source of voltage B+. Connected between ground and the aforesaid source of voltage B+ is a series circuit comprising a resistor 12, which may be a variable resistor, and a capacitor 13 which may also be variable, the junction therebetween being designated 14. The base element of transistor 10 is connected directly to junction point 14.

Although the multivibrator circuit is complete as thus far described, another circuit element, namely, a resistor 15, may be connected across capacitor 13. In view of the fact that the insertion of resistor 15 is optional, resistor 15 has been shown in dotted form in the FIG. 1 circuit. Resistor 15 may be a fixed or variable resistor and its function in the circuit will be better understood from the description of the operation which follows.

In considering the operation, it will first be assumed that capacitor 13 is uncharged at the time the circuit is first put into operation. Accordingly, when put into operation, the voltage applied to the base element of transistor 10 increases according to the RC time constant of resistor 12 and capacitor 13. During this time, the collector voltage drops and does so quite linearly. The voltage variations on the base and collector elements of transistor 10 are illustrated in FIG. 2, waveform 16 representing the voltage on the base element and waveform 17 representing the voltage on the collector element. It will be noted from the two waveforms that the base voltage rises in a linear fashion while at the same time the collector voltage drops with similar linearity, possibly even greater linearity.

The respective rise and fall of the base and collector voltages continue until the collector-base diode, which was formerly reverse biased, becomes forward biased, that is to say, until the base voltage exceeds the collector voltage or, stated differently, the collector voltage drops below the base voltage. It is at this instant that a switching action encircled by loop 18 in FIG. 2, is initiated, the switching action being caused by a regenerative action during which the transistor-capacitor loop current builds up rapidly and the capacitor discharges. Assuming that the capacitor is large enough, the transistor will "bottom," which is to say that the collector voltage will be driven to substantially zero. Following the discharge of capacitor 13, the circuit switches back to its original condition in which the transistor is again reverse biased due to the fact that the base current has now dropped to a value that will not maintain the transistor in conduction. At this time, the capacitor again commences to charge according to the aforementioned time constant so that in due time the cycle repeats itself. The frequency with which the cycle occurs is obviously dependent upon the RC time constant of resistor 12 and capacitor 13. Accordingly, by suitably varying either the capacitance of capacitor 13 or the resistance of resistor 12 and thereby varying the time constant, the pulse repetition rate or frequency of operation may be altered.

The time constant, that is, the rate at which capacitor 13 charges, may also be controlled by connecting resistor 15 across it and since this is merely an alternative way of affecting the RC time constant, resistor 15 is shown in dotted form as previously mentioned. Thus, the circuit of FIG. 1 is that of a stable free-running multivibrator whose frequency is readily adjustable. By way of example, one set of specific values for the elements of the circuit shown in FIG. 1 are presented in the table below.

| | |
|---|---|
| Variable resistor **11** | 25,000Ω |
| Variable resistor **12** | 1 megohm |
| Capacitor **13** | 10 μf. |

Transistor 10 is a 953 type of transistor.

Figure 3:
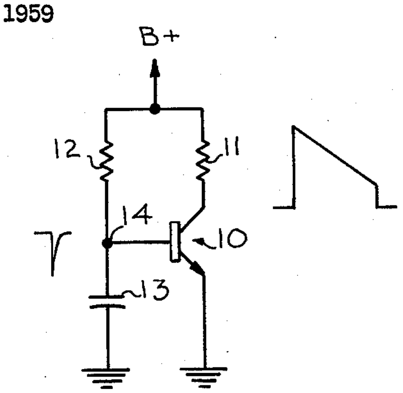
FIG. 3 is a schematic circuit of a single-shot multivibrator according to the present invention.

Referring now to FIG. 3, a circuit is shown therein which appears to be a duplicate of the circuit shown in FIG. 1. In terms of circuit elements and connections, the two circuits are indeed identical. They differ only in the values of the circuit elements and the effects produced thereby. Thus, instead of a free-running multivibrator circuit, a single-shot multivibrator is produced by reducing the value of resistor 12 and, if necessary, readjusting resistor R11, so that the circuit remains stable in the region of operation encircled in FIG. 2. In other words, by suitably adjusting circuit parameters as mentioned, transistor 10 is thereby held "bottomed" so that the base-collector diode portion of the transistor continues to remain in a forward-biased condition. Accordingly, by applying a negative pulse to junction point 14, the circuit of FIG. 3 can be made to revert to its original operating condition. It is thus seen that in this manner the pulse repetition rate of the circuit may be externally controlled and that the output rate will depend upon the frequency of the applied negative pulses. Hence, a single-shot multivibrator is obtained instead of the free-running type previously described.

Figure 4:
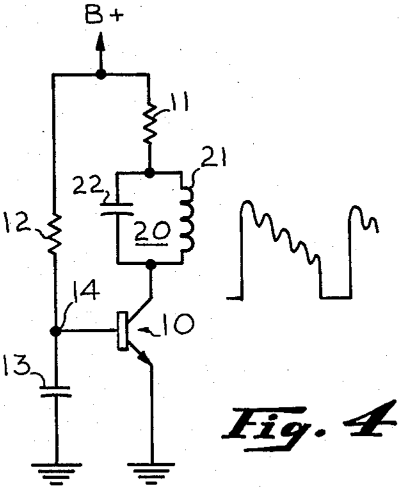
FIG. 4 is a schematic circuit of another free-running multivibrator according to the present invention.

Considering now FIG. 4, another free-running multivibrator circuit is shown therein and, as shown, this circuit is essentially the same as the circuits of FIGS. 1 and 3 previously described, with the exception that a tuned circuit 20 is inserted between the collector element of transistor 10 and resistor 11. As is well known, a tuned circuit basically comprises an inductor 21 and a capacitor 22 connected in parallel. By means of tuned circuit 20, a sinusoidal oscillation is superimposed upon the pulse waveform developed at the collector element, the frequency of the superimposed oscillation being determined by the frequency to which elements 21 and 22 are tuned. It will be obvious to those skilled in the art that the circuit of FIG. 4 therefore acts both as an oscillator and frequency divider at the same time. In a sense, the circuit of FIG. 4 may be referred to as a free-running type of ringing circuit.

Figure 5:
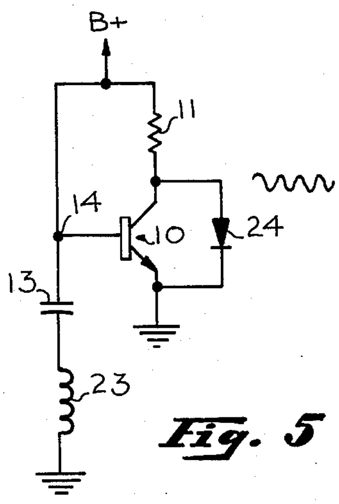
FIG. 5 is a schematic circuit of a sine-wave oscillator according to the present invention.

The basic circuit of FIG. 1 may be still further modified as shown in FIG. 5 to produce a sine-wave oscillator and this may be done by first inserting an inductor 23 between capacitor 13 and ground and second by connecting a diode 24 or other voltage-limiting device between the collector and emitter elements of transistor 10, the diode being connected to the collector element and the diode cathode being connected to the emitter element. With the addition of inductor 23 and diode 24, the combination of capacitor 13 and inductor 23 produces the oscillation, the continuance of the oscillation being assured by diode 24 which clamps the collector in the newly discovered region of operation encircled in FIG. 2 and thereby provides the positive feedback required for sustained oscillations.

Figure 6:
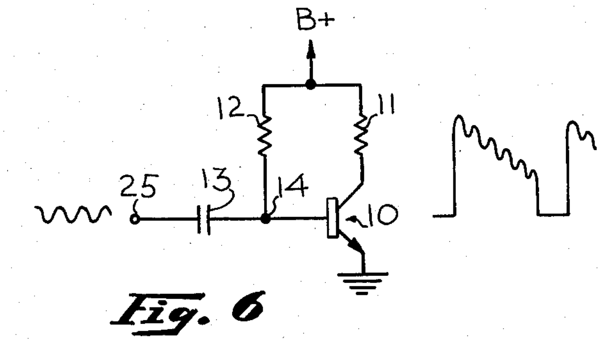
FIG. 6 is a schematic circuit of a frequency-divider circuit according to the present invention.

Referring now to FIG. 6, it will be seen that the circuit of FIG. 1 may be modified slightly to produce a frequency-divider circuit whose output signal is very similar to the output of the FIG. 4 circuit. The modification is accomplished by disconnecting capacitor 13 from ground and using the formerly grounded plate of this capacitor as an input terminal 25. By applying a sinusoidal oscillation of a predetermined frequency to input terminal 25, a pulse in the nature of waveform 17 in FIG. 2 is produced at the collector element upon which pulse is superimposed the input oscillation. By suitable adjustment of the circuit parameters, the pulse repetition frequency can be made to be a desired fraction of the frequency of the input signal, thereby achieving the desired frequency division. By means of the circuit of FIG. 6, a frequency division by a very large factor may be obtained. Considering the simplicity of the circuit, this constitutes an advance over the prior art.

Having thus described the invention, what is claimed as new is:

1. The combination comprising: a transistor having base, emitter, and collector electrodes; a capacitor connected to the base electrode of said transistor; first circuit means connected to the base electrode for positively charging said capacitor in order to apply an increasing voltage thereto; second circuit means connected to the collector electrode of said transistor for applying a decreasing voltage thereto; and a circuit loop including said transistor and capacitor, said capacitor discharging through said transistor to the emitter electrode thereof when the increasing voltage on the base electrode exceeds the decreasing voltage on the collector electrode.

2. The combination comprising: a transistor having base, emitter, and collector electrodes; a capacitor connected to the base electrode; first circuit means connected to the base eletrode for positively charging said capacitor in order to apply an increasing voltage thereto; second circuit means connected to the collector electrode for applying a decreasing voltage thereto; and a circuit loop including said transistor and capacitor, said capacitor discharging through said transistor to the emitter electrode when the increasing voltage on the base electrode exceeds the decreasing voltage on the collector electrode; said first and second circuit means each including a variable resistor.

3. The combination comprising: a transistor having base, emitter, and collector electrodes; a capacitor connected to the base electrode; first circuit means connected to the base electrode for positively charging said capacitor in order to apply an increasing voltage thereto; second circuit means connected to the collector electrode for applying a decreasing voltage thereto; and a circuit loop including said transistor and capacitor, said capacitor discharging through said transistor to the emitter electrode when the increasing voltage on the base electrode exceeds the decreasing voltage on the collector electrode; said second circuit means including a tuned circuit connected to said collector electrode.

4. The combination comprising: a transistor having base, emitter, and collector electrodes; a capacitor connected to the base electrode; first circuit means connected to the base electrode for positively charging said capacitor in order to apply an increasing voltage thereto; second circuit means connected to the collector electrode for applying a decreasing voltage thereto; a circuit loop including said transistor and capacitor, said capacitor discharging through said transistor to the emitter electrode when the increasing voltage on the base electrode exceeds the decreasing voltage on the collector electrode; and diode means connected between the collector and emitter electrodes, the diode having its anode connected to said collector electrode.

5. The combination comprising: a transistor having base, emitter, and collector electrodes; a first circuit means including a capacitor connected to the base electrode; a second circuit means coupled to the collector electrode, said first and second circuit means being operable to cyclically back-bias the base-collector electrode portion of said transistor, forward-bias said base-collector electrode portion, drive the collector voltage to substantially zero, and maintain the collector voltage at substantially zero for an interval of time; and a circuit loop including said transistor and capacitor, said capacitor discharging through said transistor to the emitter electrode when forward-biased on the base-collector electrode portion of the transistor.

References Cited in the file of this patent

UNITED STATES PATENTS 2,728,857 Sziklai ---------------- Dec. 27, 1955

OTHER REFERENCES

Pub. I, Eckess et al., Electronics, November 1955.